(12) United States Patent
Curello

(10) Patent No.: US 8,822,888 B2
(45) Date of Patent: Sep. 2, 2014

(54) FUEL CARTRIDGE FOR FUEL CELLS

(75) Inventor: Andrew J Curello, Hamden, CT (US)

(73) Assignee: Societe BIC, Clichy Cedex (FR)

( * ) Notice: Subject to any disclaimer, the term of this patent is extended or adjusted under 35 U.S.C. 154(b) by 847 days.

(21) Appl. No.: 11/560,613

(22) Filed: Nov. 16, 2006

(65) Prior Publication Data

US 2008/0115884 A1    May 22, 2008

(51) Int. Cl.
*F24D 19/08* (2006.01)
*B23B 37/00* (2006.01)

(52) U.S. Cl.
USPC ............ 219/494; 137/198; 137/197; 156/278

(58) Field of Classification Search
USPC ............... 219/494, 510; 156/60, 278; 141/98, 141/302, 351
See application file for complete search history.

(56) References Cited

U.S. PATENT DOCUMENTS

| | | | |
|---|---|---|---|
| 5,544,208 A | 8/1996 | Pao | |
| 5,858,568 A * | 1/1999 | Hsu et al. | 429/13 |
| 6,460,733 B2 | 10/2002 | Acker | |
| 6,544,400 B2 | 4/2003 | Hockaday | |
| 6,681,789 B1 | 1/2004 | Moulis et al. | |
| 6,682,186 B2 | 1/2004 | Smith | |
| 6,688,078 B2 | 2/2004 | Mauclair | |
| 6,796,644 B1 | 9/2004 | Anderson | |
| 6,797,027 B2 | 9/2004 | Stenersen | |
| 6,802,491 B1 | 10/2004 | Kelly | |
| 2002/0197522 A1 | 12/2002 | Lawrence et al. | |
| 2005/0023236 A1 * | 2/2005 | Adams et al. | 215/3 |
| 2005/0058865 A1 * | 3/2005 | Thompson et al. | 429/26 |
| 2005/0084738 A1 | 4/2005 | Ohlsen | |
| 2005/0115637 A1 * | 6/2005 | Adams et al. | 141/351 |
| 2005/0116190 A1 * | 6/2005 | Adams et al. | 251/144 |

FOREIGN PATENT DOCUMENTS

| | | |
|---|---|---|
| JP | 3009866 | 2/1995 |
| JP | 7237694 A | 9/1995 |
| JP | 9328158 A | 12/1997 |
| JP | 2000142852 A | 5/2000 |
| WO | 2007044424 A2 | 4/2007 |
| WO | 2007044425 A2 | 4/2007 |

OTHER PUBLICATIONS

The International Search Report issued in connection with PCT/US2007/084811 on Sep. 5, 2008.
Machine translation of JP 2000142852 to Satoshi.
Machine translation of JP 3009866.
Machine translation of JP09328158 to Masahiro.
Extended European Search Report issued in connection with the corresponding European Patent Application No. 07864453.1 on Nov. 23, 2010.
Translated Abstract for JP 7237694.

* cited by examiner

*Primary Examiner* — Brian Jennison
(74) *Attorney, Agent, or Firm* — The H.T. Than Law Group

(57) ABSTRACT

A method for controlling the pressure inside a fuel cartridge with a deformable inner fuel container connectable to a fuel cell is disclosed.

20 Claims, 1 Drawing Sheet

FUEL CARTRIDGE FOR FUEL CELLS

FIELD OF THE INVENTION

This invention generally relates to fuel supplies for fuel cells, and more particularly to fuel supplies that minimize pressure inside a liner within the fuel supplies.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, as well as portable power storage, such as lithium-ion batteries.

In general, fuel cell technology includes a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely (i) fuel cells utilizing compressed hydrogen ($H_2$) as fuel; (ii) proton exchange membrane (PEM) fuel cells that use alcohols, e.g., methanol ($CH_3OH$), metal hydrides, e.g., sodium borohydride ($NaBH_4$), hydrocarbons, or other fuels reformed into hydrogen fuel; (iii) PEM fuel cells that can consume non-hydrogen fuel directly or direct oxidation fuel cells; and (iv) solid oxide fuel cells (SOFC) that directly convert hydrocarbon fuels to electricity at high temperature.

Compressed hydrogen is generally kept under high pressure and is therefore difficult to handle. Furthermore, large storage tanks are typically required and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. The most common direct oxidation fuel cells are direct methanol fuel cells or DMFC. Other direct oxidation fuel cells include direct ethanol fuel cells and direct tetramethyl orthocarbonate fuel cells. DMFC, where methanol is reacted directly with oxidant in the fuel cell, is the simplest and potentially smallest fuel cell and also has promising power applications for consumer electronic devices. SOFC converts hydrocarbon fuels, such as butane, at high heat to produce electricity. SOFC requires relatively high temperatures in the range of 1000° C. for the fuel cell reaction to occur.

The chemical reactions that produce electricity are different for each type of fuel cell. For DMFC, the chemical-electrical reaction at each electrode and the overall reaction for a direct methanol fuel cell are described as follows:

Half-reaction at the anode:

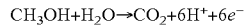

Half-reaction at the cathode:

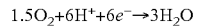

The overall fuel cell reaction:

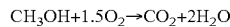

Due to the migration of the hydrogen ions ($H^+$) through the PEM from the anode to the cathode and due to the inability of the free electrons ($e^-$) to pass through the PEM, the electrons flow through an external circuit, thereby producing an electrical current through the external circuit. The external circuit may be used to power many useful consumer electronic devices, such as mobile or cell phones, calculators, personal digital assistants, laptop computers, and power tools, among others.

DMFC is discussed in U.S. Pat. Nos. 3,143,440 and 4,390,603, which are incorporated herein by reference in their entireties. Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

In another direct oxidation fuel cell, borohydride fuel cell (DBFC) reacts as follows:

Half-reaction at the anode:

$$BH_4^- + 8OH^- \rightarrow BO_2^- + 6H_2O + 8e^-$$

Half-reaction at the cathode:

$$2O_2 + 4H_2O + 8e^- \rightarrow 8OH^-$$

In a chemical metal hydride fuel cell, sodium borohydride is reformed and reacts as follows:

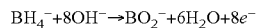

Half-reaction at the anode:

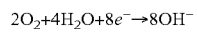

Half-reaction at the cathode:

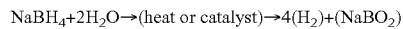

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. A sodium borohydride fuel cell is discussed in U.S. Pat. No. 4,261,956, which is incorporated herein by reference in its entirety.

One of the important features for fuel cell application is fuel storage. When a liquid fuel such as methanol is stored in the fuel supply or in a fuel liner within the fuel supply, unwanted pressure may build within the fuel supply or the fuel liner.

SUMMARY OF THE INVENTION

The present invention is directed to a method for minimizing an internal pressure inside a fuel cell fuel supply comprising the steps of filling an inner liner with a fuel cell fuel; sealing said inner liner inside an outer casing; heating the fuel supply to a temperature below the boiling point of the fuel; holding the fuel supply at said temperature for a predetermined amount of time; and cooling the fuel supply to room temperature.

DETAILED DESCRIPTION OF THE PREFERRED EMBODIMENTS

As illustrated in the accompanying drawings and discussed in detail below, the present invention is directed to a fuel supply, which stores fuel cell fuels such as methanol and water, methanol/water mixture, methanol/water mixtures of varying concentrations or pure methanol. Methanol is usable in many types of fuel cells, e.g., DMFC, enzyme fuel cells and reformat fuel cells, among others. The fuel supply may contain other types of fuel cell fuels, such as ethanol or other alcohols.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supplies.

The fuel supply of the present invention can also be used to store fuels that are not used in fuel cells. These applications include, but are not limited to, storing hydrocarbons and hydrogen fuels for micro gas-turbine engines built on silicon chips, discussed in "Here Come the Microengines," published in The Industrial Physicist (December 2001/January 2002), at pp. 20-25. As used in the present application, the term "fuel cell" also includes microengines. Other applications include storing traditional fuels for internal combustion engines, and hydrocarbons, such as butane for pocket and utility lighters and liquid propane.

When a liquid fuel, such as methanol or other alcohols, is stored in the fuel container, pressure can build up within the container over time. The pressure buildup within the fuel container may increase the velocity of fuel as it exits the container. The increase in pressure can be influenced by a number of factors, including partial vapor pressure from the fuel in the gaseous state. Methods of controlling pressure inside a fuel container are discussed in commonly-owned co-pending U.S. patent application Ser. No. 11/243,767, entitled "Fuel Cartridge for Fuel Cells," filed on Oct. 5, 2005. This application is incorporated herein by reference in its entirety.

Figure 1B:
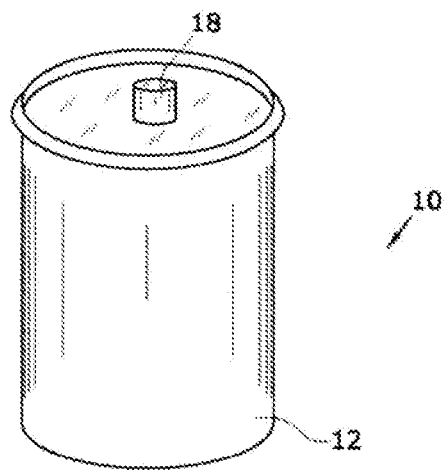
FIG. 1B is a perspective view of FIG. 1A.
Figure 1A:
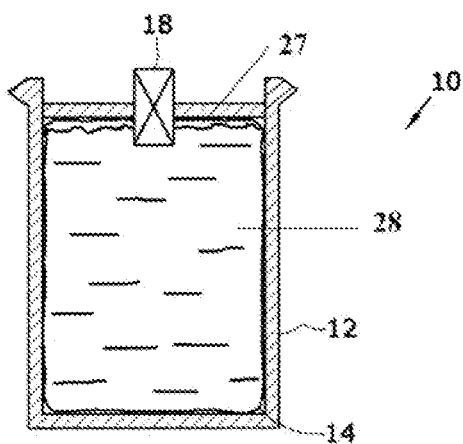
FIG. 1A is a cross-sectional view of a fuel supply in accordance with the present invention.

Referring to FIG. 1A, fuel cartridge 10 comprises an outer casing 12, and an inner fuel container 14 that contains a fuel. Fuel cartridge 10 further comprises shut-off valve 18, which is in fluid communication with inner fuel container 14. Inner fuel container 14 contains fuel 28, such as methanol or any of the suitable fuels discussed above, and may have head space 27 above the fuel.

Outer casing 12 is preferably rigid, but can also be sufficiently flexible to be compressed along with inner fuel container 14, as fuel is transported from the cartridge. A rigid outer casing can provide additional structural support to fuel liner 14. Outer casing 12 is preferably made from metals, such as stainless steel or aluminum, or from polyacetal resin, which can be injection molded or extruded. Optionally, outer casing 12 can be made from materials that are free of contaminants such as zinc, sulfur, talc and oils, and may be treated with fluorine to minimize permeation. Outer casing 12 can be made from any polymers that can be molded into substantially rigid shapes, such as low density polyethylene (LDPE), high density polyethylene (HDPE), acetal polyoxymethylene (POM), polypropylene (PP), polyethylene terephthalate (PET), polyethylene naphthalate (PEN), nylon and blends thereof. Outer casing 12 may also be made from an open mesh material, which may resist expansion of inner fuel container 14 and may collapse as fuel is withdrawn from inner fuel liner 14. Outer casing 12 can also be coated with a polymeric layer that resists permeation of gas. Outer casing 12 is most preferably made from a metal which is optionally coated with a permeation-resistant layer.

Inner fuel container 14 is preferably flexible and deformable, e.g., a fuel liner, such that the volume inside fuel liner 14 decreases when fuel is being transported to the fuel cell. Most preferably, fuel liner 14 is thin and made from a durable and flexible material so that it efficiently collapses or reduces its volume, as fuel is withdrawn. Examples of materials for the fuel liner 14 include natural rubber, polyethylene (including low density to high density PE), ethylene propylene (EP), EPDM and other thin polymeric films. The polyethylene can be laminated with a vapor barrier layer, such as aluminum foil or fluorine treated plastics, to reduce methanol permeation. Preferably, fuel liner 14 is made from a low density polyethylene, and is blow-molded to form a thin-walled bladder. Such fuel liner and outer casing and suitable materials for same are fully discussed in commonly-owned, co-pending U.S. Published Patent Application Nos. 2005/0023236-A1, entitled "Fuel Cartridge with Flexible Liner," and 2006/0030652-A1, entitled "Fuel Supplies for Fuel Cells," and commonly owned U.S. Pat. No. 7,059,582 B2. The '236 and '652 published applications and the '582 patent are incorporated herein by reference in their entireties. An advantage of having a collapsible and deformable fuel liner 14 is that since fuel liner 14 collapses as fuel is transported to the fuel cell, fuel cartridge 10 is usable in any orientation.

Shut-off valve 18 is adapted to be connected to a fuel cell (not shown) or to a refilling fuel container/cartridge or a refill adaptor. Shut-off valves are fully discussed in commonly owned, co-pending U.S. Published Patent Application No. 2005/0022883, entitled "Fuel Cartridge with Connecting Valve," the disclosure of which is incorporated herein by reference in its entirety. Shut-off valve 18 can also be replaced by a porous or fibrous material capable of transporting fuel through capillary or wicking action, or an elastomeric material that can be opened or pierced with a pin or needle such as a septum. Suitable capillary or wicking materials are fully discussed in commonly-owned, co-pending U.S. Published Patent Application No. 2004/0151962, entitled "Fuel Cartridges for Fuel Cells," the disclosure of which is incorporated herein by reference in its entirety.

The inventor of the present invention has discovered that fuel supplies 10 filled with methanol or similar fuels and stored over an extended period of time tend to develop internal pressure inside liner 14, as well as forming head space 27, even in instances where no head space was formed during the fuel filling operation. This internal pressure can stretch the wall of liner 14 and can pressurize the fuel.

In one embodiment of the present invention, a method of heating fuel prior to filling inner liner 14 and then cooling the fuel has been found to minimize the creation of internal pressure during the storage of fuel cartridge 10, and to minimize the creation of head space 27 during storage. This method is preferably to be carried out after fuel has been transported or pumped into inner liner 14. In one example, methanol fuel contained inside inner liner 14, which is contained inside a metal cylindrical outer casing 12, is heated to a temperature below its boiling point of about 65° C. for a predetermined period of time and then allowed to cool at room temperature. The pressure in this example is not controlled, but is believed to be substantially near standard pressure of 1 atm. Fuel supplies with an inner liner and metal outer casing are discussed in commonly owned, co-pending U.S. patent application Ser. No. 11/244,218, filed on Oct. 5, 2005 and in commonly owned, co-pending U.S. Provisional Patent Application Ser. No. 60/729,761, filed on Oct. 25, 2005. These two references are incorporated herein by reference in their entireties.

In one instance, methanol fuel is heated to about 55° C. for 24 hours, 48 hours and 206 hours. It was discovered that the longer the heating period, the more fuel left the cartridge. It was also discovered that when the metal outer casing was unsealed the fuel loss was a little more than 1% and when the metal outer casing was sealed the fuel loss was about half as much. When unsealed, the circular top of the cartridge, as shown in FIGS. 1A and 1B, is not sealingly attached to the rest of the metal outer casing. Additionally, a snug polymeric cap (not shown) was disposed around valve 18 for some of the sealed and unsealed samples to test for any potential flow path through valve 18. It was further discovered that in unsealed cartridges the inner liner can pressurize and there is no observable reduction in the size of the head space. On the other hand, unexpectedly, in sealed cartridges when the cartridge returned to room temperature, i.e., after about 2-3 hours, the head space disappeared and the internal pressure of the inner liner was not elevated and in some cases was at a slight vacuum.

The same test was repeated with methanol being heated to about 65° C., but below the boiling point of methanol, for 24 hours and 192 hours. Similar results were obtained, except that about twice as much fuel was lost by heating. The unexpected results of no pressure buildup and no head space in sealed cartridges were repeated. The test results are shown below.

| Heating methanol to 55° C. | Initial Weight (g) | 24 hrs. | 48 hrs | 206 hrs | Total Weight loss |
|---|---|---|---|---|---|
| Unsealed w/out cap | 219.631 | 219.246 | 218.913 | 216.985 | −2.646 |
| Unsealed w/out cap | 219.480 | 219.109 | 218.789 | 216.856 | −2.624 |
| Unsealed w/out cap | 219.388 | 219.014 | 218.704 | 216.859 | −2.529 |
| Unsealed w/cap | 220.842 | 220.449 | 220.123 | 218.119 | −2.723 |
| Unsealed w/cap | 221.413 | 221.056 | 220.756 | 218.936 | −2.477 |
| Unsealed w/cap | 221.176 | 220.788 | 220.462 | 218.519 | −2.657 |
| Sealed w/out cap | 219.042 | 218.854 | 218.688 | 217.591 | −1.451 |
| Sealed w/out cap | 229.637 | 229.437 | 229.259 | 228.181 | −1.456 |
| Sealed w/out cap | 219.304 | 219.104 | 218.925 | 217.836 | −1.468 |
| Sealed w/cap | 220.924 | 220.764 | 220.623 | 219.823 | −1.101 |
| Sealed w/cap | 221.386 | 221.214 | 221.061 | 220.143 | −1.243 |
| Sealed w/cap | 221.199 | 221.067 | 220.943 | 220.234 | −0.965 |

| Heating methanol to 65° C. | Initial Weight | 24 hrs. | 192 hrs | Total Weight loss |
|---|---|---|---|---|
| Unsealed w/out cap | 219.489 | 218.564 | 214.125 | −5.364 |
| Unsealed w/out cap | 218.550 | 217.674 | 213.263 | −5.287 |
| Unsealed w/out cap | 218.734 | 217.849 | 213.545 | −5.189 |
| Unsealed w/cap | 221.631 | 220.729 | 216.335 | −5.296 |
| Unsealed w/cap | 221.502 | 220.622 | 216.359 | −5.143 |
| Unsealed w/cap | 221.083 | 220.176 | 215.98 | −5.103 |
| Sealed w/out cap | 219.258 | 218.802 | 216.652 | −2.606 |
| Sealed w/out cap | 219.353 | 218.877 | 216.713 | −2.640 |
| Sealed w/out cap | 219.648 | 219.178 | 217.045 | −2.603 |
| Sealed w/cap | 221.246 | 220.848 | 219.284 | −1.962 |
| Sealed w/cap | 220.838 | 220.441 | 218.841 | −1.997 |
| Sealed w/cap | 219.902 | 219.543 | 217.967 | −1.935 |

The same test was again repeated with methanol being heated to about 55° C., except that in some instances valve 18 was replaced by a plug, for 24 hours, 48 hours, 72 hours and 96 hours. The test results are shown below.

| Heating methanol to 55 C. | Initial Weight | 24 hrs | 48 hrs | 72 hrs | 96 hrs | Weight Loss |
|---|---|---|---|---|---|---|
| Sealed w/ valve and cap | 221.151 | 221.017 | | | | −0.134 |
| Sealed w/ valve and cap | 220.926 | | 220.635 | | | −0.291 |
| Sealed w/ valve and cap | 221.249 | | | 220.8 | | −0.449 |
| Sealed w/ valve and cap | 221.226 | | | | 220.858 | −0.368 |
| Sealed w/ plug and cap | 220.393 | 220.196 | | | | −0.197 |
| Sealed w/ plug and cap | 220.342 | | 220.074 | | | −0.268 |
| Sealed w/ plug and cap | 220.563 | | | 220.026 | | −0.537 |
| Sealed w/ plug and cap | 220.512 | | | | 220.09 | −0.422 |

The results show that, through heating, at least some of the fuel is lost through the valve and some is lost through the wall of the inner liner. Additionally, heating for 24 hours and 48 hours does not completely remove the head space and internal pressure of the inner liner after 8 hours of cooling to room temperature, although the size of the head space and the internal pressure are less after 48 hours. Heating for 72 hours and cooling for 4 hours with the test sample with the valve and cooling for 6 hours with the test sample with the plug eliminated the head space and the elevated internal pressure in the inner liner. Heating for 96 hours and cooling for 2 hours with the test sample with the valve and cooling for 4 hours with the test sample with the plug eliminated the head space and the elevated internal pressure in the inner liner.

The sealed test samples, where the head space had disappeared, were re-evaluated after about 3 months of shelf life and no change was observed in head space and internal pressure. In other words, the head space does not reappear and the internal pressure remains unelevated. This is unexpected since these sealed test samples were "opened" so that the inner fuel liner could be removed to be weighed. The top of the test cartridge samples were put back on after the weighing but were not resealed while the test samples sat on the shelf.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

I claim:

1. A method for minimizing an internal pressure inside a fuel cell fuel supply comprising the steps of:
    i. filling an inner liner with a fuel cell fuel and sealing the fuel cell fuel within the inner liner, wherein the inner liner is flexible and deformable, such that a volume inside the inner liner decreases when the fuel cell fuel is transported out of the inner liner;
    ii. sealing said inner liner inside an outer casing;
    iii. heating the fuel supply to a temperature below the boiling point of the fuel;
    iv. holding the fuel supply at said temperature for a predetermined amount of time;
    v. cooling the fuel supply to room temperature; and
    vi minimizing an internal pressure inside a fuel cell fuel supply.

2. The method of claim 1, wherein step iv includes holding the fuel supply at said temperature for at least 48 hours.

3. The method of claim 2, wherein step iv includes holding the fuel supply at said temperature for at least 72 hours.

4. The method of claim 3, wherein step iv includes holding the fuel supply at said temperature for at least 96 hours.

5. The method of claim 1, wherein step iii includes heating the fuel to a temperature from about above room temperature and less than about 10° C. below the boiling point of the fuel.

6. The method of claim 1, wherein step iii includes heating the fuel to a temperature from about above room temperature and less than about 1° C. below the boiling point of the fuel.

7. The method of claim 1, wherein step v includes holding the fuel supply for at least 2 hours.

8. The method of claim 7, wherein step v includes holding the fuel supply for at least 4 hours.

9. The method of claim 8, wherein step v includes holding the fuel supply for at least 6 hours.

10. The method of claim 9, wherein step v includes holding the fuel supply for at least 8 hours.

11. The method of claim 1 further comprising the step of making the outer casing from metal.

12. The method of claim 11 further comprising the step of coating the outer casing with a permeation-resistant material.

13. The method of claim 1 further comprising the step of making the inner liner from polyethylene.

14. The method of claim 1, wherein the fuel cell fuel comprises methanol.

15. A method for minimizing an internal pressure inside a fuel cell fuel supply comprising the steps of:
    i. filling an inner liner with a fuel cell fuel and sealing the fuel cell fuel within the inner liner, wherein the inner liner is flexible and deformable, such that a volume inside the inner liner decreases when the fuel cell fuel is transported out of the inner liner;
    ii. heating the fuel supply to a temperature below the boiling point of the fuel;
    iii. holding the fuel supply at said temperature for a predetermined amount of time;
    iv. cooling the fuel supply to room temperature; and
    v. minimizing an internal pressure inside a fuel cell fuel supply.

16. The method of claim 15, wherein step iii includes holding the fuel supply at said temperature for at least 48 hours.

17. The method of claim 16, wherein step iii includes holding the fuel supply at said temperature for at least 72 hours.

18. The method of claim 17, wherein step iii includes holding the fuel supply at said temperature for at least 96 hours.

19. The method of claim 15, wherein step ii includes heating the fuel to a temperature from about above room temperature and less than about 10° C. below the boiling point of the fuel.

20. The method of claim 15, wherein step ii includes heating the fuel to a temperature from about above room temperature and less than about 1° C. below the boiling point of the fuel.

* * * * *